(12) United States Patent
Sommers et al.

(10) Patent No.: US 6,737,030 B2
(45) Date of Patent: May 18, 2004

(54) METHOD FOR SEPARATING HAFNIUM FROM ZIRCONIUM

(75) Inventors: James A. Sommers, Albany, OR (US); Jeff G. Perrine, Albany, OR (US)

(73) Assignee: ATI Properties, Inc., Albany, OR (US)

( * ) Notice: Subject to any disclaimer, the term of this patent is extended or adjusted under 35 U.S.C. 154(b) by 160 days.

(21) Appl. No.: 10/059,680

(22) Filed: Jan. 29, 2002

(65) Prior Publication Data

US 2003/0143138 A1 Jul. 31, 2003

(51) Int. Cl.$^7$ .................. C01G 25/00; C01G 27/00; B01D 11/00
(52) U.S. Cl. .................................................. 423/70
(58) Field of Search ................................ 423/70, 73

(56) References Cited

U.S. PATENT DOCUMENTS

| | | | |
|---|---|---|---|
| 2,938,769 A | 5/1960 | Overholser et al. | |
| 2,952,513 A | 9/1960 | Wigton | |
| 3,006,719 A | 10/1961 | Miller | |
| 3,032,388 A | 5/1962 | McCord et al. | |
| 3,069,232 A | 12/1962 | Greenberg et al. | |
| 4,065,544 A | 12/1977 | Hamling et al. | |
| 4,202,862 A | 5/1980 | Jacoby et al. | |
| 4,243,649 A | 1/1981 | Brugger | |
| 4,256,463 A | 3/1981 | Carter | |
| 4,737,244 A | 4/1988 | McLaughlin et al. | |
| 4,749,448 A | 6/1988 | Stoltz et al. | |
| 4,865,693 A | 9/1989 | McLaughlin | |
| 4,865,694 A | 9/1989 | Snyder et al. | |
| 4,865,695 A | 9/1989 | Snyder et al. | |
| 4,874,475 A | 10/1989 | McLaughlin et al. | |
| 4,876,232 A | 10/1989 | Barkatt | |
| 4,913,884 A | 4/1990 | Feuling | |
| 4,923,577 A | 5/1990 | McLaughlin et al. | |
| 5,004,711 A | 4/1991 | Grodek | |
| 5,098,678 A | 3/1992 | Lee et al. | |
| 5,110,566 A | 5/1992 | Snyder et al. | |
| 5,132,016 A | * 7/1992 | Voit ........................ | 210/639 |
| 5,133,865 A | 7/1992 | Abodishish et al. | |
| 5,160,482 A | 11/1992 | Ash et al. | |
| 5,174,971 A | 12/1992 | Snyder et al. | |
| 5,176,878 A | 1/1993 | Sarbeck et al. | |
| 5,397,554 A | 3/1995 | Voit | |
| 5,470,550 A | 11/1995 | Voit | |
| 5,618,502 A | 4/1997 | Byers et al. | |
| 5,762,890 A | 6/1998 | Byers et al. | |

OTHER PUBLICATIONS

Report of Investigations 5499, United States Department of the Interior, U. S. Bureau of Mines, 1959, no month.

* cited by examiner

Primary Examiner—Steven Bos
(74) Attorney, Agent, or Firm—Patrick J. Viccaro

(57) ABSTRACT

A method is provided to optimize separation of zirconium from hafnium by extraction of a feed mix including (Zr+Hf)OCl$_2$ with a thiocyanate-containing organic phase. The method includes maintaining the TA/MO$_2$ ratio in a range from greater than about 2.55 to about 3.5.

21 Claims, 2 Drawing Sheets

METHOD FOR SEPARATING HAFNIUM FROM ZIRCONIUM

BACKGROUND

1. Field of the Invention

A process is provided for separating hafnium from zirconium in a solution prepared from zirconium oxychloride.

2 Description of the Related Art

Commercial scale separation of Zr and Hf traditionally involves a liquid—liquid extraction process, wherein hafnium is extracted from an aqueous phase containing mixed tetrachlorides into an organic phase. The $ZrCl_4$ and contaminating $HfCl_4$ are derived from the carbochlorination of zircon ($ZrSiO_4$), in which the Hf is a naturally-occurring impurity. Hafnium typically is present in such mixtures to the extent of about 2% by weight (wt.) of the Zr. Processes for separating Hf from Zr are described in, for example, U.S. Bureau of Mines (USBM) Report of Investigations 5499 (1959), entitled "Zirconium-Hafnium Separation" ("USBM 5499"), and U.S. Pat. Nos. 2,938,769; 2,952,513; 3,006,719; 3,069,232; 4,202,862; and 5,160,482 and the references cited therein, the disclosures of all of these patents being incorporated herein by reference in their entirety.

The typical process practiced commercially today is much as described in USBM 5499. That document, however, devotes little space to the difficulties in deriving the mixed chlorides of Zr and Hf. In U.S. Pat. No. 5,160,482, more of these difficulties are recounted. One primary difficulty is that commercially available zirconium tetrachloride ($(Zr+Hf)Cl_4$) typically contains contaminants such as Fe, P, Al, Ra, Th and U which are removed by additional sub-processes. Typical commercially-available $(Zr+Hf)Cl_4$ preparations include iron content, which must be removed prior to extraction of the Hf content because Fe often causes polymerization of the organic constituents of the separation mixture. Therefore, there is need for an improved process that can obtain the products of separation, the respective pure oxides $ZrO_2$ and $HfO_2$.

Briefly, in the presently practiced art, the mixed tetrachlorides of Zr and Hf are dissolved in water to yield a strongly acidic aqueous solution. To this solution is added a solution of ammonium thiocyanate, and this combined solution is countercurrently contacted in extraction columns with a solution of thiocyanate in the substantially water-immiscible solvent, methyl isobutyl ketone (MIBK). This contact occurs in large columns involving many stages of interphase mass transfer, over which the Hf preferentially reports to the MIBK (organic) phase, while the Zr, remaining in the aqueous phase, gradually is enriched so that the aqueous phase contains less than the 100 ppm wt. Hf/(Hf+Zr) required for use in nuclear reactors. At the same time, in the organic phase, the Hf is enriched to about 98%. The Zr and Hf "raffinate" streams, are then processed by methods described in the art to recover $ZrO_2$ with <100 ppm wt. Hf/(Hf+Zr) with <2% wt. Zr. These extractions typically take place in multiple columns, substantially as shown in USBM 5499 (FIG. 3) and in U.S. Pat. No. 2,938,769 (FIG. 2).

U.S. Pat. Nos. 2,938,769 and 3,006,719 each disclose separation of Zr and Hf substantially as described above, but using zirconium oxychloride $(Zr+Hf)OCl_2$, commercially available as $(Zr+Hf)OCl_2 \cdot 8H_2O$ crystals, as a feed material, which contains contaminating $HfOCl_2$ at similar levels as found in commercially available pre-separation $(Zr+Hf)Cl_4$. Use of $(Zr+Hf)OCl_2$, is advantageous because there are less heavy metal contaminants in the commercially-available $(Zr+Hf)OCl_2$ as compared to commercial preparations of $(Zr+Hf)Cl_4$. U.S. Pat. Nos. 2,938,769 and 3,006,719 describe mixing $(Zr+Hf)OCl_2$ feed stock with a thiocyanate salt, typically $NH_4SCN$, and certain quantities of HCl. The feed stock is contacted with an organic phase containing thiocyanic acid, into which the Hf partitions. Although this extraction method often works well, the extraction of Hf from the aqueous phase to produce an aqueous Zr-containing raffinate stream, is fraught with inconsistency. For commercial viability, the Hf must be removed from the aqueous phase so that levels of Hf less than 100 ppm wt. Hf/(Hf+Zr) in the aqueous Zr-containing raffinate stream are realized consistently.

SUMMARY

In recognition that the acidity of the $(Zr+Hf)OCl_2$ feed stock affects the separation of Hf+Zr, provided is an improved method for separating Zr species ($ZrOCl_2$ and $ZrCl_4$) and Hf species ($HfOCl_2$ and $HfCl_4$) from a feed stock prepared from $(Zr+Hf)OCl_2 \cdot 8H_2O$ crystals. The method recognizes that the ratio of total acid in the feed stock to total metal Zr+Hf species must be maintained at certain levels to achieve system stability for the Hf extraction process.

Described herein is a method for separating hafnium and zirconium, and, alternatively to optimize separation thereof. The method includes the steps of extracting an aqueous feed stock comprising zirconium oxychloride and hafnium oxychloride and a thiocyanate salt with a suitable thiocyanate-containing organic solvent to produce a zirconium-containing aqueous raffinate stream and a hafnium-containing organic raffinate stream. In the method, the $TA/MO_2$ ratio (the ratio of total acidity (moles/L) to metal oxide $(Zr+Hf)O_2$ (moles/L), in calcined feed stock) of the aqueous feed stock is maintained in a range of from greater than about 2.55 to less than about 3.5, with a ratio of about 2.75 being a typical target ratio. The extraction step may be conducted in, for example, multiple columns by contacting the aqueous feedstock with a countercurrent stream of the organic solvent. A method of preparing the above-described feedstock also is provided.

DETAILED DESCRIPTION

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within these ranges. Also, the disclosure of these ranges is intended as a continuous range including every value between the minimum and maximum values.

Increasingly available is an alternate source of soluble (Zr+Hf) values, in the form of commercial zirconium oxychloride crystals, $ZrOCl_2 \cdot 8H_2O$. This material is derived from zircon, also the source of $ZrCl_4$, but in the course of its manufacture, many of the impurities, such as Fe, P, Al, Si, Ti, Th, Ra and U, are removed, making it a relatively pure material. The last three mentioned elements are important, since they are radioactive. The manufacture of this material, however, does not affect the Hf level, so that a separation would still be necessary for any $ZrO_2$ derived therefrom for use as reactor grade material. The process of separating Zr and Hf from a solution of $(Zr+Hf)OCl_2$ in the literature is difficult to operate at best. This poses a formidable barrier to commercial practicability, since a process that cannot consistently deliver low Hf levels in the aqueous Zr-containing raffinate stream will not produce a $ZrO_2$ product acceptable for many applications. Because a separation process of this complexity is necessarily costly to operate, inconsistency of separation has rapid economic consequences. One complication in using feed stock prepared from $(Zr+Hf)OCl_2 \cdot 8H_2O$ is that the aqueous solution derived from dissolving mixed tetrachlorides $(Zr+Hf)Cl_4$ is much more acidic than a metal-equimolar solution prepared by dissolving $(Zr+Hf)OCl_2 \cdot 8H_2O$. The manner of addressing this issue has been to add acid to the feed stock. However, this standard process does not reproducibly produce a Zr-containing raffinate stream with acceptably low levels of Hf. It has now been discovered that if a separation feedstock is prepared wherein a supplementary supply of acid, added as hydrochloric acid (HCl), is used, and the acid levels are maintained at certain levels, the separation columns can in other respects be operated substantially as if using a $(Zr+Hf)Cl_4$ feedstock to reproducibly produce both Zr raffinate with a low Hf level and Hf raffinate with an acceptable Zr level.

Figure 1:
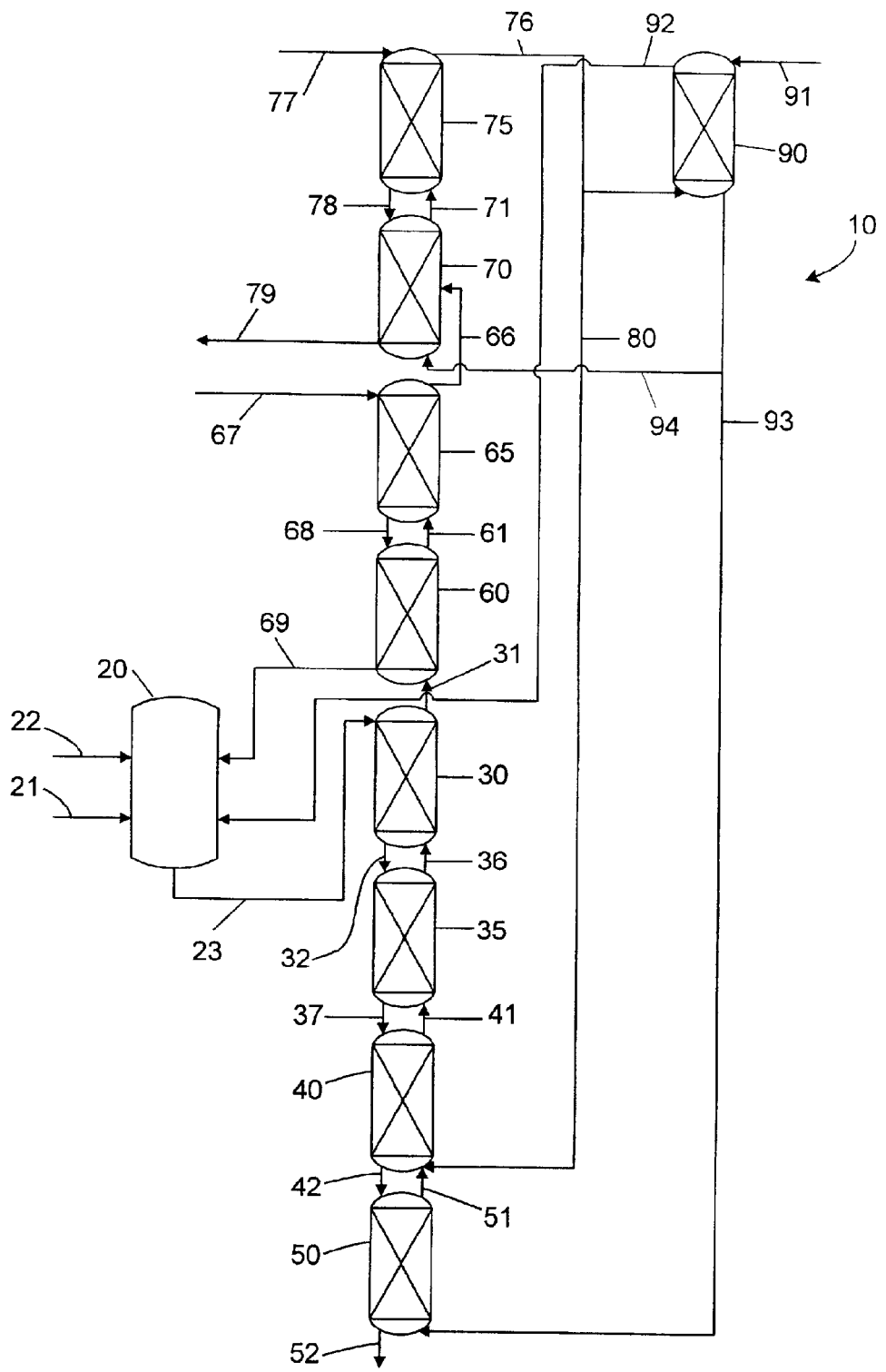
FIG. 1 is a schematic diagram of one embodiment of a system for separating hafnium from zirconium.

FIG. 1 is a schematic diagram of one embodiment of a system 10 for separating zirconium from hafnium and is based on current zirconium/hafnium separation systems as are known in the art. In FIG. 1, all conduits are fluidly connected to the column(s) to which they are attached. Operation of system 10 is conducted substantially in a manner that is well-established in the art, with flow rates through the various feed conduits and concentrations of various reagents being typical of that type of extraction system, as is described in USBM 5499 and in U.S. Pat. Nos. 2,938,769; 2,952,513; 3,006,719; 3,069,232; 4,202,862; and 5,160,482 and the references cited therein.

As an overview, there are six subsystems of system 10. The first is the feed mix pot, where an aqueous solution prepared from $(Zr+Hf)OCl_2 \cdot 8H_2O$ (feed mix) is prepared. The second subsystem is an extraction subsystem in which hafnium is extracted from the feed mix by a thiocyanate-containing organic stream to produce an aqueous zirconium raffinate stream and a hafnium-enriched organic raffinate stream. Third is a thiocyanate recovery subsystem by which thiocyanate is removed from the aqueous zirconium raffinate stream generated by the extraction subsystem.

The fourth subsystem is a stripping subsystem by which zirconium that escaped the extraction step, and some hafnium, is extracted from the hafnium-enriched organic raffinate stream exiting the extraction subsystem. In the stripping subsystem, the zirconium is extracted from the organic phase by contact with an aqueous solution of dilute HCl and dilute $H_2SO_4$. The aqueous phase produced by this stripping subsystem is a recycle stream that is fed into the feed mix pot for re-extraction. The fifth subsystem is a scrubbing subsystem by which the remaining hafnium is extracted from the organic stream generated by the stripping subsystem by contact with an aqueous phase of dilute $H_2SO_4$. Hafnium is purified from the aqueous stream exiting the scrubbing subsystem by standard methods. A portion of the organic stream generated by the scrubbing system is recycled for use as the thiocyanate-containing organic stream of the extraction subsystem, which is used to extract hafnium from the aqueous zirconium system. Lastly, the sixth subsystem includes a solvent regeneration system by which the remainder of the thiocyanate-containing organic solvent generated by the scrubbing system is neutralized with an aqueous phase of ammonium hydroxide, which produces an aqueous phase of ammonium thiocyanate and a thiocyanate-free organic phase. The ammonium thiocyanate produced by the solvent regeneration system is added to the feed mix.

With specific reference to FIG. 1, feed mix pot 20 includes a feed source inlet conduit 21, for adding a feed source of $(Zr+Hf)OCl_2$ to feed mix pot 20. Acid inlet conduit 22 is provided for introducing acid, typically HCl, to feed mix pot 20. Feed mix outlet conduit 23 transfers feed mix containing $(Zr+Hf)OCl_2$ to the columns of system 10.

Feed mix flows from feed mix pot 20 through feed mix outlet conduit 23 into first extraction column 30 and sequentially through second and third extraction columns 35 and 40, respectively, which are connected by conduits 32 and 37. Thiocyanate-containing MIBK passes from extraction column 40 to extraction column 35 and then to extraction column 30 through conduits 41 and 36, respectively. Extraction columns 30, 35 and 40 may be any column suitable for countercurrent extraction of an aqueous solution with a substantially immiscible organic phase ("organic solvent"), such as the columns shown and described in USBM 5499 and U.S. Pat. Nos. 2,938,769, 3,006,719 and 5,160,482. The organic solvent typically is methyl isobutyl ketone (MIBK), but may be other substantially water-immiscible organic solvents, as are known in the art, for example as are described in U.S. Pat. No. 2,938,769, column 2, line 67 through column 3, line 2. A zirconium-containing raffinate stream exits extraction column 40 through zirconium raffinate conduit 42 and enters thiocyanate recovery column 50, which also is any suitable column for countercurrent organic extraction of an aqueous phase with a substantially immiscible organic phase. Thiocyanate recovery column 50 also is connected to extraction column 40 by organic feed conduit 51. Zirconium raffinate conduit 52 is attached to thiocyanate recovery column 50, from which substantially thiocyanate-free zirconium raffinate exits system 10 for recovery of $ZrO_2$ according to standard methods.

System 10 also includes stripping columns 60 and 65. Hafnium-bearing organic solvent passes from extraction column 30 into first stripping column 60 via conduit 31, passes from first stripping column 60 to second stripping column 65 through conduit 61 and out of the second stripping column 65 through organic conduit 66. A mixture of dilute HCl (2.5 N) and dilute (4 N) $H_2SO_4$ is fed into second stripping column 65 through acid feed conduit 67, passes from second stripping column 65 to first stripping column 60 through conduit 68 and is transferred from first stripping column 60 to feed mix pot 20 by conduit 69. Coincidentally, the acid solution transferred to feed mix pot 20 via conduit 69 contains zirconium oxychloride and hafnium oxychloride in approximately the same concentrations as the feed mixture entering first extraction column 30 through feed mix outlet conduit 23, thereby permitting additional recovery of zirconium carried with the organic hafnium raffinate passing from extraction column 30 to stripping column 60 through conduit 31.

Scrubbing columns 70 and 75 are provided in which a solution of dilute $H_2SO_4$ is used to extract hafnium from the organic hafnium raffinate stream exiting second scrubber 65 through conduit 66. Hafnium-containing organic raffinate stream passes into first scrubbing column 70 at an intermediate point of column 70 through conduit 66, into second scrubbing column 75 through conduit 71 and exits second scrubbing column 75 through conduit 76. In column 70, the hafnium-containing raffinate stream passing through conduit 66 joins a stream of regenerated organic solvent passing through conduit 94, described below. Sulfuric acid (4 N) enters second scrubber 75 through sulfuric acid feed conduit 77, passes from second stripping column 75 into first stripping column 70 by sulfuric acid conduit 78 and exits system 10 through hafnium raffinate conduit 79 for further processing according to standard methods. Thiocyanate-containing organic solvent exits second scrubbing column 75 through conduit 76 and is split into two streams, a first stream which passes into third extraction column 40 through organic isocyanate recycle conduit 80 and a second stream which passes into mixer-settler 90 in which thiocyanate is recovered from the organic phase.

Thiocyanate is removed in a conventional mixer-settler 90 from a portion of the thiocyanate-containing organic solvent that exits second scrubbing column 75 through organic conduit 76. In mixer-settler 90, the thiocyanate-containing organic stream is contacted counter-currently with a neutralizing stream of ammonium hydroxide, which enters mixer-settler 90 through ammonium hydroxide feed conduit 91. The ammonium thiocyanate-containing aqueous phase exits mixer-settler 90 through conduit 92 and is fed into feed mix pot 20. Thiocyanate-free organic stream exits mixer-settler 90 through conduit 93 and is fed into thiocyanate recovery column 50 for use in removing thiocyanate from the zirconium-containing raffinate stream passing into thiocyanate recovery column 50 from third extraction column 40 through aqueous conduit 42. A portion of the organic stream passing through conduit 93 is directed through conduit 94 into the bottom of first scrubbing column 70.

In use, extraction columns, thiocyanate recovery column, stripping columns, scrubbing columns and solvent regeneration columns may be the same or different, so long as they permit the desired extractions between organic and aqueous phases. Further, while one to three columns are shown for each respective extraction, stripping, scrubbing, regeneration and recovery step, the number, type and length of each column might be varied as in a manner that is well known in the art.

Feed and flow rates may be adjusted by any known method. For example, for the system 10 of FIG. 1 (column parameters provided below in Table 1), the concentration ranges and feed rates may be as follows. The concentration of the $(Zr+Hf)OCl_2$ feed source typically is in the range of 50 g/L (grams per liter) to 300 g/L, with more typical ranges falling approximately between 200 g/L and 260 g/L, with approximately 240 g/L being the concentration used in the example described below at a feed rate through feed source inlet conduit 21 of about 280 G/hr (gallons per hour). Supplemental concentrated HCl was fed into feed mix pot 20 through acid inlet conduit 22 at a rate of about 60–80 G/hr, with the overall goal of adjusting the ratio of total acid (TA) to metal oxide of the feed mix passing from feed mix pot 20 to first extraction column 30 via conduit 23 to between greater than about 2.55 to about 3.5, with a ratio of about 2.75 being the target ratio. The recycle phase passing through conduit 69 into feed mix pot 20 has a flow rate of about 150 G/hr, corresponding to the feed of HCl through acid feed conduit 67 of about 130 G/hr and the feed of dilute $H_2SO_4$ through acid feed conduit 67 of about 20 G/hr. A solution of ammonium thiocyanate is fed from mixer-settler 90 to feed mix pot 20 through conduit 92 at a rate of about 250 G/hr. The concentrations of the various constituents as well as their feed rates and flow rates at critical junctures in the system may be modified according to known practices.

Much of the above-described structure and the steps of the process embodied therein are directed to the recycling of the various chemical constituents of the process, such as solvent and thiocyanate recycling. As such, any of the recycling steps may be partially or wholly omitted and replaced by feeds of fresh materials, even though typical Zr- and Hf-separating systems operate, as a matter of economic and environmental practicability, with all of the described recycling steps intact. For instance, there is literally no need for solvent recycling from the scrubbing and solvent regeneration subsystems, nor is there literally a need for recycling of ammonium thiocyanate from the solvent regeneration subsystem. Further, the stripping subsystem may be omitted in its entirety, even though it improves the recovery of the zirconium. However, if any recycling steps are omitted, care must be taken to ensure that the acid is added to the feed mix pot after the $(Zr+Hf)OCl_2$ feed mix is diluted with the ammonium thiocyanate solution to prevent precipitation of the $(Zr+Hf)OCl_2$ by the acid. In a system such as that shown in FIG. 1, solvent and thiocyanate occasionally are replenished by the addition of those materials, as needed.

It has been determined that in optimizing the recovery of substantially hafnium-free zirconium in the system described herein, and in other Zr–Hf liquid—liquid extraction processes using a $(Zr+Hf)OCl_2$ feed mix, the value of the ratio of total acidity of the feed mix/molar concentration of $(Zr+Hf)O_2$ in calcined feed mix ("$TA/MO_2$ ratio") should range from greater than about 2.55 to less than about 3.5, preferably with a suitable target ratio range of between about 2.6 and about 3.0, with 2.75 being a suitable target ratio, falling approximately at a mid point in a preferred range. It has been found that when the $TA/MO_2$ ratio of the feed mix falls below about 2.55, the extraction system becomes unstable for much longer periods of time than the time period in which the $TA/MO_2$ ratio falls below 2.55. In such an unstable system, $HfO_2$ levels in the aqueous Zr-containing raffinate stream typically rise above 100 ppm wt. of total $(Zr+Hf)O_2$ in the raffinate stream (ppm Hf/(Zr+Hf)). Similarly, the system occasionally becomes unstable (>100 ppm Hf/(Zr+Hf) in the aqueous Zr-containing raffinate stream) when the $TA/MO_2$ ratio exceeds 3.5.

The term "total acidity" is defined as the quantity of acid, expressed in mol/L, neutralized by titration of the column feed mix (through conduit 23 in reference to FIG. 1) to the bromocresol green endpoint. The molar concentration of $(Zr+Hf)O_2$ is the weight of oxide recovered by ignition at 1000° C. of column feed mix, expressed in mol/L. In this manner, the $TA/MO_2$ ratio of the feed mix may be monitored periodically during system operation.

By "feed mix," it is meant the mixture comprising the sum of (1) the source $(Zr+Hf)OCl_2$ values dissolved in water, derivable from $(Zr+Hf)OCl_2$ crystals (the "feed source"); (2) the recycle stream, recycled from stripper subsystem, as described above; (3) supplemental concentrated HCl; and (4) ammonium thiocyanate solution (typically recovered from the solvent regeneration step, and preferably as concentrated as possible, usually about 8M in $NH_4SCN$). The $TA/MO_2$ for (1) by itself is about 2.2 for $(Zr+Hf)OCl_2 \cdot 8H_2O$ crystals dissolved in pure water. Once again, although not economically or environmentally practicable, the ammonium thiocyanate (4) does not need to be recovered from the solvent regeneration step and the recycle stream (2) may be omitted or replaced by an equivalent non-recycled stream.

EXAMPLE

A zirconium raffinate stream was prepared according to the method described above in connection with FIG. 1, with column parameters as follows and with flow rates described above. All extractor columns (3 columns), stripper columns (2), scrubber columns (2) and the thiocyanate recovery column are manufactured from Furan-lined fiberglass. Each column measured 32 inches in diameter and 58 feet, 2 inches between the organic phase inlet at the column bottom and the aqueous-organic phase interface at the top of the column. The columns were packed with ceramic saddles according to standard methods for promoting interphase contact. The solvent regeneration subsystem was a mixer-settler of conventional type.

Figure 2:
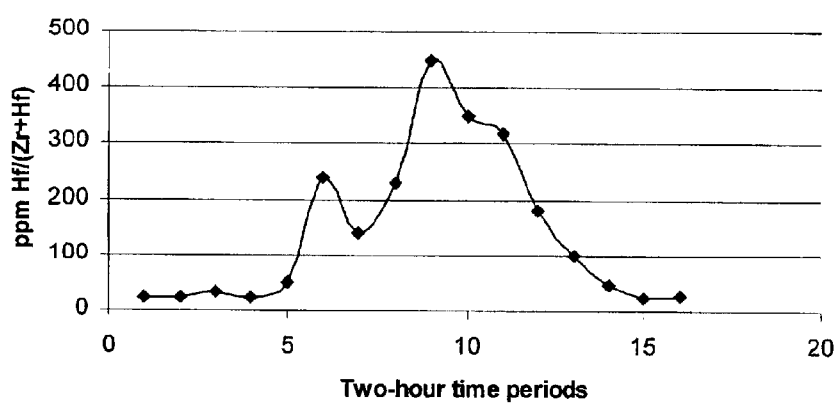
FIG. 2 is a graph showing hafnium levels in the zirconium raffinate stream prepared according to an embodiment of the method described herein.

In plant operation, the TA/MO$_2$ ratio of the column feed mix was allowed to drift too low, the value of that parameter at one point being less than 2.55 for about 11 hours. TA/MO$_2$ ratios were monitored periodically as described above. When the TA/MO$_2$ drifted below 2.55 for about 11 hours, the Hf level in the Zr raffinate began to rise and remained elevated over the desired level of about 50 ppm Hf/(Zr+Hf) for about 20 hours, as is shown in FIG. 2. This event illustrates how consequential instability a drop below a TA/MO$_2$ ratio of 2.55 can be, since the deviation from the desired acidity was small. Corrective action was applied to raise the acidity by increasing the flow of supplemental HCl, but this disturbance required a significant additional time (9 hours) before normal operation was restored to the system, that is, Hf levels fell to below 50 ppm wt. Hf/(Zr+Hf). In additional experimentation, using the same system configuration, it also has been observed that the system does not reproducibly produce an aqueous Zr-containing raffinate stream with Hf levels below the target of 50 ppm wt. Hf/(Zr+Hf) when the TA/MO$_2$ ratio exceeded about 3.5.

We claim:

1. A method for separating hafnium and zirconium, comprising the steps of:
    (a) extracting an aqueous feed mix comprising zirconium oxychloride and hafnium oxychloride and a thiocyanate salt with a thiocyanate-containing organic solvent to produce a zirconium-containing aqueous raffinate stream and a hafnium-containing organic raffinate stream, wherein the TA/MO$_2$ ratio of the aqueous feed mix is maintained in a range of from greater than about 2.55 to less than about 3.5; and
    (b) separating the organic raffinate stream from the aqueous raffinate stream.

2. The method of claim 1, wherein the TA/MO$_2$ ratio of the aqueous feed mix is maintained at about 2.75.

3. The method of claim 1, wherein the thiocyanate salt is ammonium thiocyanate.

4. The method of claim 1, wherein the organic solvent is methyl isobutyl ketone.

5. The method of claim 1, wherein the aqueous feed mix is prepared by combining:
    (a) an aqueous solution comprising zirconium oxychloride and hafnium oxychloride;
    (b) an aqueous recycle stream comprising hafnium raffinate stripped from the hafnium-containing organic raffinate stream using HCl and, optionally, dilute H$_2$SO$_4$;
    (c) a solution comprising NH$_4$SCN; and
    (d) an amount of hydrochloric acid sufficient to adjust the TA/MO$_2$ ratio of the aqueous feed mix from greater than about 2.55 to about 3.5.

6. The method of claim 5, wherein the hydrochloric acid is added in an amount sufficient to adjust the TA/MO$_2$ ratio of the aqueous feed mix from greater than about 2.55 to about 3.0.

7. The method of claim 5, wherein the hydrochloric acid is added in an amount sufficient to adjust the TA/MO$_2$ ratio of the aqueous feed mix to about 2.75.

8. The method of claim 5, wherein the NH$_4$SCN is recovered from the organic raffinate stream.

9. The method of claim 8, wherein the NH$_4$SCN is recovered from the organic raffinate stream by:
    (a) stripping zirconium from the organic raffinate stream using HCl and, optionally, dilute H$_2$SO$_4$;
    (b) scrubbing the stripped organic raffinate stream with H$_2$SO$_4$ to remove a substantial portion of the hafnium from the organic raffinate stream, thereby producing a scrubbed organic raffinate stream;
    (c) removing the thiocyanate from the scrubbed organic raffinate stream by neutralizing the organic raffinate stream with an aqueous solution of ammonium hydroxide to produce an NH$_4$SCN-containing aqueous stream and a regenerated organic stream.

10. The method of claim 9, wherein the scrubbed organic raffinate stream is used as a substantial portion of the thiocyanate-containing organic solvent in the extracting step.

11. The method of claim 9, wherein the regenerated organic stream is used to extract thiocyanate from the aqueous raffinate stream.

12. The method of claim 1, wherein thiocyanate is extracted with organic solvent from the aqueous raffinate stream.

13. The method of claim 1, wherein the aqueous feed mix is contacted with a countercurrent stream of the organic solvent.

14. The method of claim 13, wherein the aqueous feed mix is contacted with a countercurrent stream of the organic solvent in a plurality of sequential columns, the aqueous feed mix flowing through each of the plurality of sequential columns from a first column to a last column, and the organic stream flowing from the last column to the first column in reverse sequence to the flow of the aqueous feed mix.

15. A method for making aqueous feed mix lot use in a method for organic extraction of hafnium from zirconium in the presence of thiocyanate, comprising the step of combining:
    (a) an aqueous solution prepared from (Zr+Hf) OCl$_2$.8H$_2$O;
    (b) a solution comprising NH$_4$SCN; and
    (c) an amount of hydrochloric acid sufficient to adjust the TA/MO$_2$ ratio of the aqueous feed mix from greater than about 2.55 to about 3.5, wherein the hydrochloric acid is added after the solution comprising NH$_4$SCN.

16. The method of claim 15, wherein the hydrochloric acid is added in an amount sufficient to adjust the TA/MO$_2$ ratio of the aqueous feed mix from greater than about 2.55 to about 3.0.

17. The method of claim 15, wherein the hydrochloric acid is added in an amount sufficient to adjust the TA/MO$_2$ ratio of the aqueous feed mix to about 2.75.

18. The method of claim 15, wherein the aqueous solution comprising zirconium oxychloride and hafnium oxychloride comprises zirconium- and hafnium-containing raffinate stripped with HCl and, optionally, dilute H$_2$SO$_4$ from a hafnium-containing organic raffinate stream generated by extracting aqueous feed mix with thiocyanate-containing organic solvent.

19. A method for optimizing organic extraction of hafnium oxychloride from an aqueous feed mix comprising zirconium oxychloride, hafnium oxychloride and thiocyanate ions, comprising the step of maintaining the TA/MO$_2$ ratio of the aqueous feed mix from greater than about 2.55 to about 3.5.

20. The method of claim 19, wherein hydrochloric acid is added in an amount sufficient to adjust the TA/MO$_2$ ratio of the aqueous feed mix from greater than about 2.55 to about 3.0.

21. The method of claim 19, wherein the hydrochloric acid is added in an amount sufficient to adjust the TA/MO$_2$ ratio of the aqueous feed mix to about 2.75.

* * * * *

UNITED STATES PATENT AND TRADEMARK OFFICE
CERTIFICATE OF CORRECTION

PATENT NO. : 6,737,030 B2 Page 1 of 1
DATED : May 18, 2004
INVENTOR(S) : James A. Sommers et al.

It is certified that error appears in the above-identified patent and that said Letters Patent is hereby corrected as shown below:

<u>Column 8,</u>
Line 28, "lot" should read -- for --

Signed and Sealed this

Fifth Day of April, 2005

JON W. DUDAS
*Director of the United States Patent and Trademark Office*